Jan. 17, 1939. T. R. KENNEDY 2,144,378
INDUCTION HEATER
Original Filed Sept. 11, 1937  2 Sheets-Sheet 1

WITNESS
Thomas A. Feehan

INVENTOR.
THEODORE R. KENNEDY
BY Frank T. Chesnut
ATTORNEY.

Jan. 17, 1939.    T. R. KENNEDY    2,144,378
INDUCTION HEATER
Original Filed Sept. 11, 1937    2 Sheets-Sheet 2

WITNESS
Thomas A. Freehan

INVENTOR.
THEODORE R. KENNEDY
BY Frank T. Chesnut
ATTORNEY.

Patented Jan. 17, 1939

2,144,378

UNITED STATES PATENT OFFICE 2,144,378

INDUCTION HEATER

Theodore R. Kennedy, Morrisville, Pa., assignor to Ajax Electrothermic Corporation, Ajax Park, Ewing Township, N. J., a corporation of New Jersey Original application September 11, 1937, Serial No. 163,340. Divided and this application August 24, 1938, Serial No. 226,402

3 Claims. (Cl. 219—11)

My invention has to do with inductive electric heating and relates to methods and apparatus for local or differential heating.

This application is a division of my copending application U. S. 163,340 filed September 11, 1937.

A purpose of my invention is to provide an inductor, with a single current path, wherein a high current may be made to flow, obtaining thereby a maximum of inductive heating in a charge piece adjacent thereto, in series with multiple current paths, each path in close proximity to the charge piece but separated from other return paths, reducing and minimizing the inductive effect of the current in the multiple paths.

A further purpose is to provide a focus inductor having outward and return paths closely surrounding an electrically conducting charge, having the paths convergent over the portion of the charge it is desired to heat and divergent elsewhere about the charge.

A further purpose is to enhance the heating of a portion of the surface of a charge by providing an unusually concentrated inductive and hysteresis effect at the point of heating.

A further purpose is to provide a focus inductor wherein the main inductor carrying current in a substantially linear direction is substantially surrounded by a portion of a charge piece and another portion of the focus inductor carrying current in the opposite direction.

A further purpose is to provide an inductor wherein outward and return current paths, though both in close proximity to a charge piece heat the same only under preferred portions of the inductor.

Other purposes will appear in or be evident from the specification and claims.

By way of illustration of my invention I have used nineteen figures, choosing examples which well represent the invention but which are in no way intended to limit its application or scope.

Figures 1 to 6 inclusive show the relative fields and current concentrations in single and multiple conductors carrying alternating current.

Figures 9 to 12 inclusive show the relative inductive effects of narrow and broad inductors having single and multiple return paths.

Figure 13:
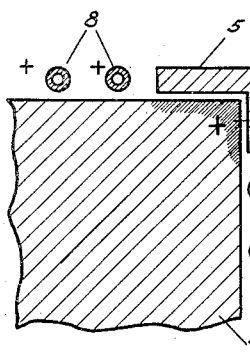
Figure 14:
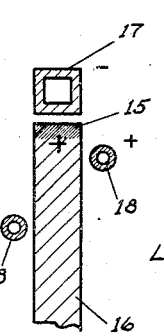
Figure 15:
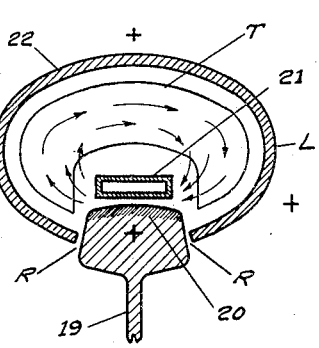

Figures 13 and 14 represent applications described in the main case (U. S. 163,340) and included herein for reference only, while Figure 15 represents the species claimed in this divisional case. Figure 15 shows in addition how the hysteresis heating effect is increased by making the rail and divided return path substantially surround the main inductor.

Figure 16:
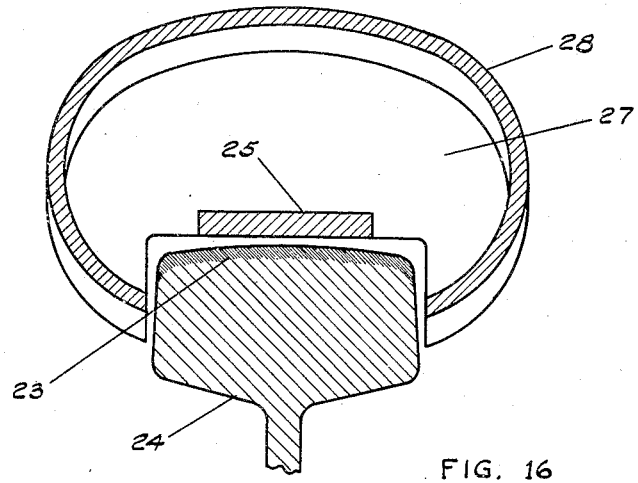
Figure 17:
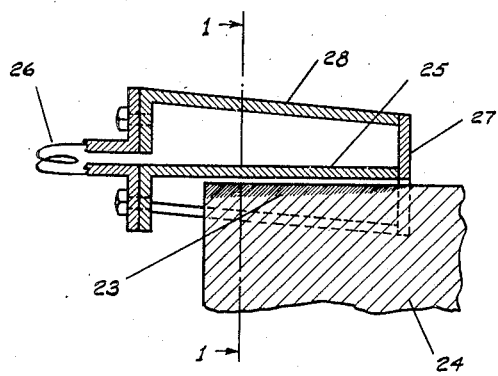
Figure 18:
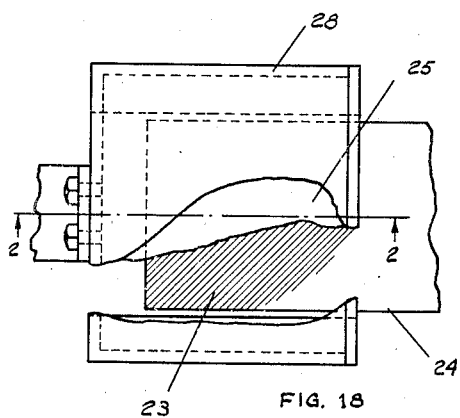

Figures 16 to 18 inclusive show an adaptation of my invention to the heating of the end bearing portion of a rail head. Figure 16 is an end section view of the rail head and inductor taken along the line 1—1 of Figure 17. Figure 17 is an elevation sectional view of the rail and inductor of Figure 16, the section being taken on the line 2—2 of Figure 18. Figure 18 is a top plan view, partly cut away, of the rail head and inductor of Figure 16. In each of these views, as well as in Figures 13 to 15 inclusive, the shaded portion illustrates the portion it is desired to heat.

Figure 19:
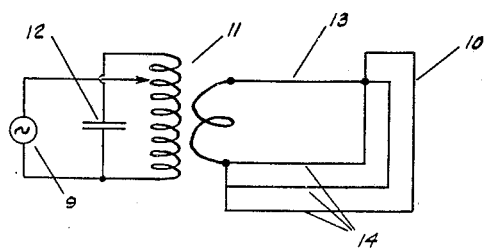

Figure 19 is a circuit diagram which may be used in carrying out my invention.

Inductive heating is extremely versatile in its application, and economic or technical considerations control to a large extent whether or not it can be applied to any specific case. It has always been a problem, for instance, to effectively heat thin flat sheets, in competition with fuel fired furnaces or electric resistance furnaces. The thin flat sheets do not offer a good inductive load. Likewise it has been difficult to heat the edge portion of shear blades, rails, and like charge pieces by direct induction and with sufficient uniformity and efficiency to make the operation commercially successful. Such pieces have been heated by a combination of resistance conduction and induction heating, but in many cases it has not been desirable to make actual contact with the piece to effect the conduction of the necessarily large heating currents. Heretofore where straight induction has been relied upon to effect the heating of such pieces, the effective coupling between charge and inductor has been so poor that impractically large currents have been required in the inductor; or the coupling has been made better, with the effect that additional heating has been incurred at positions remote from the desired location.

By my invention I am able to greatly augment the current induced, and hence the heating, in a desired portion of a charge piece without unduly heating other parts of the charge. The current induced into the charge heats the charge in proportion to the square of its magnitude, and when the current paths are divided as herein described the heating effect may be sharply limited to a desired part. On the other hand the coupling between the inductor and charge over the portion of the charge it is desired to heat and over the portion it is not desired to heat may remain close and constant. It is by keeping this overall coupling close that I am able to so greatly augment the current flow where desired. In addition I have devised methods of shaping specific inductors whereby the magnetic field ordinarily associated therewith may be concentrated into a section of a magnetic charge piece, adding a very effective hysteresis heating to the already augmented inductive heating.

In Figures 1 to 15 inclusive electrical conductors of many shapes and spacings are shown. Each piece shown in section may be assumed to have length extending downward through and perpendicular to the plane of the paper. The minus sign indicates an instantaneous value of alternating current flowing downward into the conductor while the plus sign indicates current flowing upward from the plane of the paper. No distinction has been made in marking main or induced current.

Figure 1:
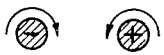
Figure 2:
Figure 3:
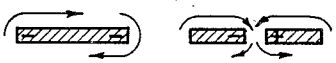
Figure 4:

In Figure 1, with current flowing downward into the conductor, the magnetic field surrounds the conductor in a clockwise direction. In Figure 2 the directions of current and magnetic field are reversed. In Figure 3 the conductor is shown as having substantial width, with the induction effect operating to make the current flow in paths apart from each other. It should be noted that the induction effect of alternating current is enhanced with increased frequency, and that applicant is here dealing with the higher frequencies, common in the induction heating field. In Figure 3 the magnetic field loops the conductor as a whole and flows in the same direction around both current paths. In Figure 4 two conductors are shown carrying current in opposite directions. The magnetic fields of the current buck each other over the conductors, but combine between the conductors resulting in a more concentrated field at this point. The currents, being of opposite polarity, crowd toward adjacent edges of the elongated conductors, overcoming to a large degree the spreading effect described in connection with Figure 3.

Figure 5:
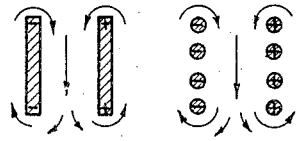
Figure 6:
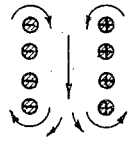

Figures 5 and 6 show the typical magnetic fields and current paths set up in helical inductors of unit and multi-turn coils respectively.

Figure 7:
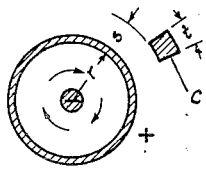
Figure 7 shows a conductor carrying alternating current in one direction, in concentric relation with another conductor carrying current in the opposite direction.

J. J. Thomson in his book "Elements of Electricity and Magnetism", Cambridge University Press (Eng.), third edition (1904), page 365, in discussing concentric conductors, as shown in Figure 7, shows that with equal currents of opposite polarity flowing in coaxial conductors, the field outside of the outer conductor is equal to zero, and that there is a very strong coordinating field between the two conductors. Thus, in Figure 7, with current flowing downward in the central inductor, its field will be clockwise as shown. The internal field of the outer cylinder will also be clockwise with respect to the central conductor. Since the inductive effect of the portion of the current contained in the segment $t$ of the central conductor on an external conductor C at a radius $r$ plus $s$ is equal to and opposite to the inductive effect of the portion of the current contained in the same segment of the outer conductor at a radius $s$, there will be no external field capable of operating to induce a current in the conductor C.

Figure 8:
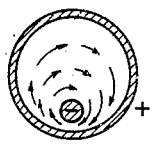
Figure 8 shows inner and outer conductors as in Figure 7, but eccentrically spaced with respect to each other showing how a concentrated magnetic field is obtained between the two.

It has been assumed, and tests seem to bear out the assumption, that as the inner conductor in Figure 7 is made eccentric with respect to the outer conductor, as in Figure 8, the total magnetic field between the two remains the same, but that it becomes more concentrated as the distance between them diminishes. It has also been assumed, and tests again seem to bear out the assumption, that if a portion of the outer conducting wall is removed and is replaced by a conducting charge in close proximity to the edges left in the remaining portion, and in close proximity to the inner conductor, then the same crowding of the magnetic field will result with little or no appreciable external magnetic field.

Returning again to the inductive effect, as opposed to the hysteresis effect, in Figures 9 to 12 inclusive, I have shown sections of plate, inductively disposed beneath conductors carrying alternating current. In each of the examples I have shown one main inductor in which the current is designated by the minus sign, and one or more return conductors, in which the current is designated by the plus sign, which carry a total current equal to that in the main conductor. I have also noted in the plates the corresponding induced currents, marking the plate with plus or minus signs as the case may be.

Figure 9:

In Figure 9 there is only one return conductor. In this case the same current flows in the return as in the main conductor, and the heating current induced in the plate will be as great under the return as under the main inductor.

Figure 10:
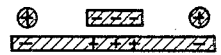

In Figure 10 the main inductor is broadened a little, and two return conductors are supplied. The return conductors are spaced from the main conductor to such a degree that there is little tendency for the current in the main inductor to spread to the ends by induction from these return conductors. There is a corresponding tendency for the current to flow more or less uniformly in the main inductor because of the attraction from the induced current in the plate beneath it. Assuming that the main inductor covers the same area as each return conductor, which, because of its extra width it of course does not, the current induced by the main inductor is twice as great as that induced by either of the return conductors. The heating due to currents induced in the plate by either return conductor will be only one-quarter of that due to the main conductor; the heating varying with the square of the current induced. With the current divided as described and even with the added width of the main inductor it is obvious that the area under the main inductor will be heated to a greater extent than under the return paths. However, due to the close proximity of the return paths to the charge the coupling of the system as a whole is good.

Figure 12:
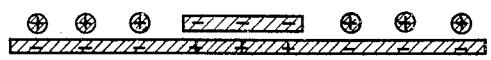

By extending the method, the division of the return current may be carried still further. In Figure 12, I have shown six return paths, each increasing the coupling between inductor and charge, but each carrying only one-sixth the current carried by the main. The heating due to currents induced in the plate by each of the return conductors will be only a small percentage of that produced by the main inductor, again taking into account its added width. It will be seen that by my invention I can distribute the current to effect a maximum or a minimum degree of heating in a charge piece without impairing the over-all coupling.

Figure 11:

In Figure 11 I have shown an extreme case where the main inductor is very wide and where two return inductors are so closely spaced to it that the induced plate currents are unable to hold the main current uniform over its whole section. The main current is practically halved and the induced current under each edge of the main inductor is substantially equal to that induced by each return path. Dark or unheated areas are left beneath the mid portion of the main inductor, and between the main and return conductors in the plate. In a critical heating job the coupling, spacing, and division of the inductor must be carefully studied.

In describing the foregoing I have referred to main and return conductors, but my invention is not intended to be limited by such wording. The inductor may be of any shape, or it may be divided and united as much as is required for a given job.

In Figure 13 I have shown in sectional view the arrangement of conductors found suitable for heating one edge of a broad shear blade. A main inductor 5 is disposed angularly around the edge 6 of the shear block 7 to be heated. Return conductors 8 improve the coupling of the main inductor with the charge, divide the return current path to prevent heating except under the main inductor, and incidentally decrease the total impedance of the inductor circuit.

One electrical circuit used to energize the heating device described above and elsewhere in this specification is shown in Figure 19. A high frequency generator 9 feeds a focus inductor 10 through the medium of a step down transformer 11. Capacitors 12 are used to correct the power factor. The focus inductor is shown in the above figure as having a main inductor 13 and a plurality of auxiliary conductors 14.

In Figure 14 the edge 15 of a bar 16 is shown in position for heating. Here the main inductor 17 is placed directly over the edge to be heated, while return paths 18 are arranged at spaced positions on the sides of the bar to distribute and minimize the heating effect due to current flowing in them.

Heating the top surface of a rail is not very different from the heating of the edge of a shear blade or bar, but I have used such an application as an example to point out how inductors and/or conductors may be spaced and shaped to concentrate the magnetic field into a portion of an object to add a pronounced hysteresis heating effect to the inductive effect.

In Figure 15, I have shown a rail 19 on which it is desired to heat, and quench for hardening, a surface portion 20. An inductor 21 is placed over and along the rail and close to the surface to be heated. The return conductor 22 is made to loop around the main heating inductor with its edges spaced down and along the sides of the rail head. The spacing between these edges and the rail head is very close. The induction and current division effect are similar to that discussed in connection with Figures 10 and 11. The inductor 21 is rather wide which would place it in the Figure 11 class, but the return conductor 22 has a very weak inductive effect at the edges, which partly compensates for the extra width. The current in the return conductor will flow through its whole width, with crowding at the extreme edges near the rail head. If these edge portions are placed high on the rail side the effect is to push the heated section away from the top edges and more nearly under the main inductor; but if they are placed low, as shown, the heated portion extends outward to the top sides of the head. The induction effect of the current in the edges of the return conductor is slight and does not tend to heat the lower sides of the rail head.

By shaping the return conductor 22 as described it assumes the characteristics of an external conductor as described in connection with Figure 8. The magnetic field of the main inductor coordinates the inner field of the return conductor producing a strong magnetic field which crowds into and over the top portion of the rail head. Since the rail head is nominally magnetic the field actually passes through the surface which it is desired to heat, causing considerable heating by the hysteresis effect.

The external field of the return conductor 22 is assumed to be negligible. Actually it is believed that a slight field does exist and that this field is somewhat dependent upon the air gaps between the return conductor edges and the rail head, as at R. If this space is great it seems obvious that some lines will escape and take the longer path around the return conductor.

It is believed that the return conductor need not actually surround the main inductor and charge to produce the crowded internal magnetic field, but that if it is made of two separate conductors, as for instance of width L—R, or some greater or lesser width, where the reluctance of the path between L—L is less than twice that of L—R, taking into account the reactive effect of the air gap at R, the field will still travel around the main rather than the two separated return inductors. In this connection it is obvious that the reluctance of the path L—L may be decreased by the use of a transformer iron core piece T, and that by choosing selected positions along the rail head or object to be heated the heating may be effectively controlled by the addition of such cores.

Since it is frequently desirable to heat only the top end portion of a rail head, I have shown one adaptation of my invention in Figures 16–18 inclusive. Here it is desired to heat the top end portion 23, of the rail head 24 to a temperature for quenching and hardening. An electric circuit such as shown in Figure 19 is employed where a focus inductor 10 having a main inductor 13 and two or more auxiliary conductors 14 are fed from an alternator 9, through the medium of a step down transformer 11, all as previously described.

The main inductor 25 in Figures 16 to 18 corresponds to 13 in Figure 19. It is made to lie over and close to the portion 23 of the rail head which it is desired to heat. Current passes through this inductor from the transformer source 26, and then upward and outward with respect to the rail head through an end baffle 27 into the surrounding return path or hood 28, and back to the current source. The rail head is heated on the end surface 23 by a combined induction and hysteresis effect as described in connection with Figure 15. It will be noted that the hood or return path in this rail end heater does not lie parallel to the rail surface and that the edges of the return path dip lower on the sides of the rail head away from the power source. This follows a reasoning heretofore described. As the end of the main inductor is approached the heating tends to concentrate near the center of the rail head surface, and by dropping the side return paths this heated area is broadened as shown by the shaded area.

While I have made no special point of water cooling the inductors and/or conductors described herein, it is obvious that they may be so cooled. It is also obvious that after reviewing my specification many applications other than those therein described will be evident to persons skilled in the art of inductive heating, and it is requested that United States Letters Patent be granted for all that is claimed.

I claim:

1. An inductor comprising outward and return current paths, said outward path lying close to the position of a charge to be heated and said return path looping over and around said outward path and forming only with the portion of the charge to be heated substantially a complete enclosure for said outward current path.

2. An induction device for heating an edge portion of a bar, comprising a main inductor lying along and close to the position of the edge of the bar to be heated and a return conductor lying over said main inductor and extending around same, the edges of said return conductor substantially abutting the position of the side flanks of the bar a little below the portion of the edge which it is desired to heat.

3. An induction heating device comprising a main inductor, a return conductor following along, folded around, spaced from and substantially enclosing said main inductor, but forming between its two edges and said main inductor a recessed charge-receiving space, and magnetic laminations between the main inductor and return conductor, placed at right angles to the direction of said main inductor.

THEODORE R. KENNEDY.